(12) United States Patent
Elmer (10) Patent No.: US 6,983,358 B2
(45) Date of Patent: Jan. 3, 2006

(54) METHOD AND APPARATUS FOR MAINTAINING STATUS COHERENCY BETWEEN QUEUE-SEPARATED FUNCTIONAL UNITS

(75) Inventor: Tom Elmer, Austin, TX (US)

(73) Assignee: IP-First, LLC, Fremont, CA (US)

(*) Notice: Subject to any disclaimer, the term of this patent is extended or adjusted under 35 U.S.C. 154(b) by 609 days.

(21) Appl. No.: 10/279,213

(22) Filed: Oct. 23, 2002

(65) Prior Publication Data
US 2005/0273579 A1 Dec. 8, 2005

Related U.S. Application Data (60) Provisional application No. 60/345,456, filed on Oct. 23, 2001.

(51) Int. Cl.
*G08F 9/38* (2006.01)
(52) U.S. Cl. .................... 712/219; 712/214; 712/215
(58) Field of Classification Search ............. 712/214, 712/215, 219
See application file for complete search history.

(56) References Cited

U.S. PATENT DOCUMENTS 5,745,726 A * 4/1998 Shebanow et al. .......... 712/216
5,850,533 A * 12/1998 Panwar et al. .............. 712/216

* cited by examiner

Primary Examiner—William M. Treat
(74) Attorney, Agent, or Firm—E. Alan Davis; James W. Huffman

(57) ABSTRACT

An apparatus and method in a microprocessor having two unaligned functional unit pipelines which enables an instruction queue for the second pipeline to be placed at an intermediate pipeline stage rather than after the stage in the first pipeline that retires instructions. The apparatus maintains coherency between the status of each instruction in the queue relative to its status in the first pipeline. The status comprises an age of the instruction and a valid bit. The age specifies the stage in the first pipeline in which the instruction resides. The apparatus includes logic for updating the age and valid bit based on whether the first pipeline is stalled, on valid bits from the first pipeline, and on whether the queue is downshifting. The microprocessor selectively updates its user-visible state with the instruction execution results from the second functional unit based on the instruction age and valid bit.

50 Claims, 4 Drawing Sheets

FIG. 1 (Prior Art)

*Microprocessor*

FIG. 2

*Microprocessor*

FIG. 3

MXU Queue Control Logic

FIG. 4

| LdX_P | PS(X)[1] | PS(X)[0] | NS(X)[1] | NS(X)[0] |
|---|---|---|---|---|
| 0 | 0 | 0 | 0 | 1 |
| 0 | 0 | 1 | 1 | 0 |
| 0 | 1 | 0 | 1 | 1 |
| 0 | 1 | 1 | 1 | 1 |
| 1 | 0 | 0 | 0 | 0 |
| 1 | 0 | 1 | 0 | 0 |
| 1 | 1 | 0 | 0 | 0 |
| 1 | 1 | 1 | 0 | 0 |

Table 1.

FIG. 5 clock 1

PS(3)   NS(3)   Val(3)
 10      11      1
         └── instruction is in integer pipeline W-stage clock 2

Ld2_P = 0   ;not loading instruction
Gate_A = 1  ;instruction moved down integer pipeline
Hld2_P = 0  ;no hold, receive shifted down values
Except_W = 1 ;an exception occurred PS(2) <-- NS(3)  ;11
Val(2) <-- 0    ;invalidated by exception

METHOD AND APPARATUS FOR MAINTAINING STATUS COHERENCY BETWEEN QUEUE-SEPARATED FUNCTIONAL UNITS

This application claims priority based on U.S. Provisional Application Ser. No. 60/345,456, filed Oct. 23, 2001, entitled METHOD AND APPARATUS FOR MAINTAINING STATUS COHERENCY BETWEEN QUEUE.SEPARATED FUNCTIONAL UNITS.

FIELD OF THE INVENTION

This invention relates in general to the field of pipelined microprocessors, and particularly pipelined microprocessors with multiple functional units.

BACKGROUND OF THE INVENTION

Modern microprocessors typically have multiple functional units, such as an integer unit (IU), a floating-point unit (FPU) and a vector arithmetic unit, such as an MMX unit (MXU), for executing integer, floating-point, and multimedia instructions, respectively. Each of the functional units is a pipeline of multiple stages, each of which executes a portion of an instruction or operation as it moves through the stage.

The FPU and MXU typically require more clocks to execute an instruction than the IU, because the floating-point and multi-media instructions typically involve lengthier arithmetic computations. The fact that the FPU and MXU require more clocks to execute an instruction than the IU can cause the IU pipeline to stall in some situations, such as when the FPU or MXU is not yet ready to receive another instruction or operation. Additionally, the fact that the FPU and MXU require many clocks to execute can cause inefficiency in the data cache since the data cache may have to stall because the FPU or MXU is not ready to receive data that the cache is ready to provide to it. To solve these problems, an instruction and data queue may be added to the FPU or MXU for receiving instructions and their associated data in order to allow the IU and data cache to continue running.

Microprocessors include the notion of a user-visible state of the microprocessor. For example, in x86 architecture processors, the user-visible state includes the user-visible register file, which includes general purpose registers such the EAX register, registers associated with functional units, such as the floating-point registers, and other registers such as the flags register.

An instruction is not permitted to update the user-visible state, e.g., to modify the register file, until it has reached a point of completion defined by the processor architecture. This is because certain events or conditions may occur that invalidate the instruction. That is, certain events or conditions may occur such that the processor should stop executing the instruction, and in particular, should not update the user-visible state of the processor. For example, the instruction may have been speculatively fetched and entered into the execution stream based on a branch instruction prediction. If the processor later determines that the branch was mispredicted, the instructions following the branch that were speculatively executed must be invalidated and not allowed to update the user-visible state of the processor, even though they may have been partially completed by the various stages of the functional unit pipelines. Another example of an invalidating event is an exception, such as a page fault exception, general protection exception, or invalid opcode exception. Additionally, an instruction may simply be invalid to begin with in the pipeline. The most common cause of this condition is a stall or bubble caused by a miss in the instruction cache resulting in pipeline stages being void of valid instructions.

When a functional unit such as an FPU is ready to finish executing an instruction, the FPU needs to update the user-visible state of the processor based on the particular instruction being executed. In order to update the user-visible state, the FPU must know that the instruction is still valid, i.e., that the instruction is authorized to update the user-visible state of the processor. In order to insure that the instruction is still valid, a conventional microprocessor, places the queue at the end of the functional unit that performs the instruction validation function.

Figure 1:
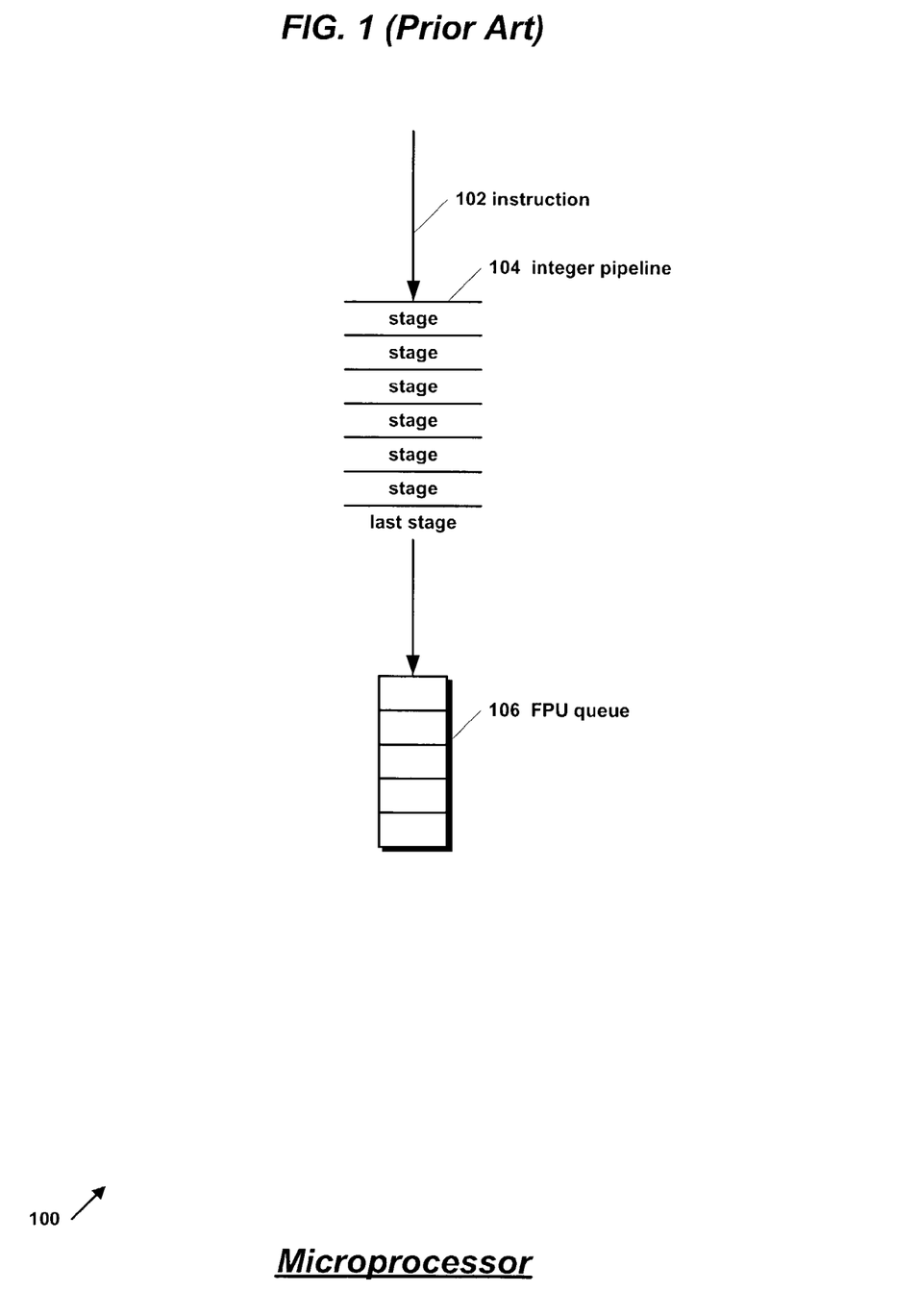
FIG. 1 is a prior art microprocessor with a functional unit queue at the end of the integer pipeline.

For example, in microprocessor 100 of FIG. 1, an integer pipeline 104 is the functional unit that performs the instruction validation function. That is, invalidating conditions, such as branch mispredictions or exceptions, are reported to the integer pipeline 104, which keeps track of whether an instruction or operation is valid based on the conditions reported to it. The conventional microprocessor 100 of FIG. 1 places the queue 106 at the end of the integer pipeline 104, as shown. Hence, an instruction 102 must proceed through the integer pipeline 104 before being placed into the FPU queue 106. By placing the queue 106 at the end of the integer pipeline 104, it is guaranteed that no events or conditions can occur to invalidate the instruction or operation once it reaches the end of the integer pipeline 104. Therefore, the instruction is guaranteed to be valid once it reaches the end of the pipeline 104 and enters into the FPU queue 106.

However, there is a disadvantage to placing the queue at the end of the functional unit that performs the validation function. By requiring the instruction to proceed to the end of the validating functional unit pipeline before entering the queue, the instruction incurs the additional latency of having to pass through the bottom stages of the validating functional unit pipeline potentially unnecessarily before entering the queue. That is, the functional unit may be capable of receiving the instruction to begin execution of it at a stage of the validating functional unit pipeline well before the end of the pipeline. For example, the data cache may have already provided the data needed by the other functional unit, such as an FPU, at a stage in the middle of the validating functional unit pipeline. Hence, the clock cycles required for the instruction to pass through the remaining validating functional unit pipeline stages constitute an unnecessary latency.

An example where the additional latency is problematic is in the case of an MXU that provides integer multiplication facilities for the integer unit. Because the MXU includes an integer multiplier for executing MXU multiply instructions, the integer multiplier in the integer unit could be eliminated to reduce the size of the microprocessor circuit die size, and the integer multiply instructions could be executed instead by the MXU integer multiplier. However, due to the fact that integer multiply instructions are relatively frequent in program instruction sequences, the additional latency to an integer multiply introduced by placing the MXU queue at the end of the integer unit pipeline may be intolerable.

However, by placing the MXU queue architecturally at a stage after which the instruction could be invalidated, the MXU is no longer guaranteed that the instruction is still valid once it enters the MXU queue. That is, because the MXU queue is located before the end of the integer pipeline, an invalidating condition may occur while the instruction is in the MXU queue or while the MXU is executing the instruction after having received the instruction from the queue. As an instruction proceeds through the IU and MXU pipelines, it is no longer in lock step. Consequently, the MXU does not know whether it can update the user-visible state, since, for example, the integer unit may have invalidated the instruction during any interval of latency in the MXU queue.

Therefore, a mechanism is needed for maintaining coherency of instruction status between functional units due to the unalignment introduced by the functional unit queues.

SUMMARY

The present invention provides an apparatus for tracking the age of instructions or operations in a functional unit instruction queue irrespective of the position of the instruction or operation in the queue. That is, the functional unit maintains at all times the corresponding IU pipeline stage in which the instruction resides. In addition, the functional unit maintains a valid bit for each instruction in the queue. If the IU informs the functional unit that an instruction has been invalidated, the functional unit updates the valid bit accordingly. If an instruction completes in the functional unit and its age indicates that it has passed the end of the IU pipeline and it is still valid, the functional unit is free to update the user-visible state of the machine. Furthermore, if the instruction has not completed in the functional unit and the age of the instruction indicates that it has passed the end of the IU pipeline and is still valid, the functional unit knows that it must complete the instruction.

Accordingly, in attainment of the aforementioned object, it is a feature of the present invention to provide an instruction queue in a microprocessor. The instruction queue includes a first plurality of storage elements, which each store an instruction to be executed by a first functional unit. The instruction is also stored in one of a plurality of pipeline stages of a second functional unit. The instruction queue also includes a second plurality of storage elements, coupled to the first plurality of storage elements, which each store an age of the instruction stored in a corresponding one of the first plurality of storage elements. The age specifies which of the second functional unit plurality of pipeline stages the instruction is stored in. The instruction queue also includes a third plurality of storage elements, coupled to the first plurality of storage elements, which each store a valid bit of the instruction stored in the corresponding one of the first plurality of storage elements. The valid bit specifies whether the instruction is valid.

In another aspect, it is a feature of the present invention to provide an apparatus in a microprocessor for maintaining instruction status coherency between two instruction pipelines that operate asynchronously due to an instruction queue separating the two pipelines. The instruction queue has N entries for storing N instructions. The apparatus has N logic elements corresponding to the N instruction queue entries. Each of the N logic elements includes an age register, which stores an age of one of the N instructions received on an age signal. The age specifies a stage in which the instruction is also stored in a first of the two pipelines. Each of the N logic elements also includes a valid register, which stores a valid bit of one of the N instructions. Each of the N logic elements also includes a multiplexer, which selects one of a plurality of valid bit signals for provision to the valid register based on the age signal. The valid bit signals specify whether instructions stored in a corresponding plurality of stages of the first pipeline are valid.

In another aspect, it is a feature of the present invention to provide a microprocessor. The microprocessor includes a first instruction pipeline comprising a plurality of stages that store instructions. The microprocessor also includes a second instruction pipeline, coupled to the first instruction pipeline, which receives from the first instruction pipeline a first portion of the instructions to execute. The microprocessor also includes an instruction queue, coupled to store a second portion of the first portion of instructions until the second instruction pipeline is ready to execute the second portion. The microprocessor also includes control logic, coupled to the instruction queue, which stores a present state and a valid bit for each instruction of the second portion. The present state specifies one of the plurality of first instruction pipeline stages in which the instruction of the second portion is stored.

In another aspect, it is a feature of the present invention to provide a method for maintaining instruction status coherency between functional units in a microprocessor whose stages are unaligned due to the presence of a queue. The method includes storing an instruction in a pipeline stage of a first functional unit, storing in the pipeline stage a first valid bit for the instruction, and storing the instruction in a queue of a second functional unit until the second functional unit is ready to execute the instruction. The method also includes storing in the queue a second valid bit for the instruction, and storing in the queue an age of the instruction. The age specifies which pipeline stage of the first functional unit the instruction is stored in. The method also includes receiving a signal indicating whether the first functional unit pipeline is stalled, and updating the age and the second valid bit based on the first valid bit and the receiving of the signal.

In another aspect, it is a feature of the present invention to provide an instruction queue in a microprocessor. The instruction queue includes a first plurality of storage elements that each store an instruction to be executed by a first functional unit. The instruction is also stored in one of a plurality of pipeline stages of a second functional unit. The instruction queue also includes a second plurality of storage elements, coupled to the first plurality of storage elements, that each store an age of the instruction stored in a corresponding one of the first plurality of storage elements. The age specifies one of the second functional unit plurality of pipeline stages. The specified one of the second functional unit plurality of pipeline stages stores a present status of the instruction.

An advantage of the present invention is that it avoids the latency associated with the conventional method of placing the instruction queue at the end of the pipeline of the functional unit that performs the instruction validation function, and instead allows the placement of the queue in an earlier stage of the pipeline, while ensuring correct instruction execution.

Other features and advantages of the present invention will become apparent upon study of the remaining portions of the specification and drawings.

DETAILED DESCRIPTION

Figure 2:
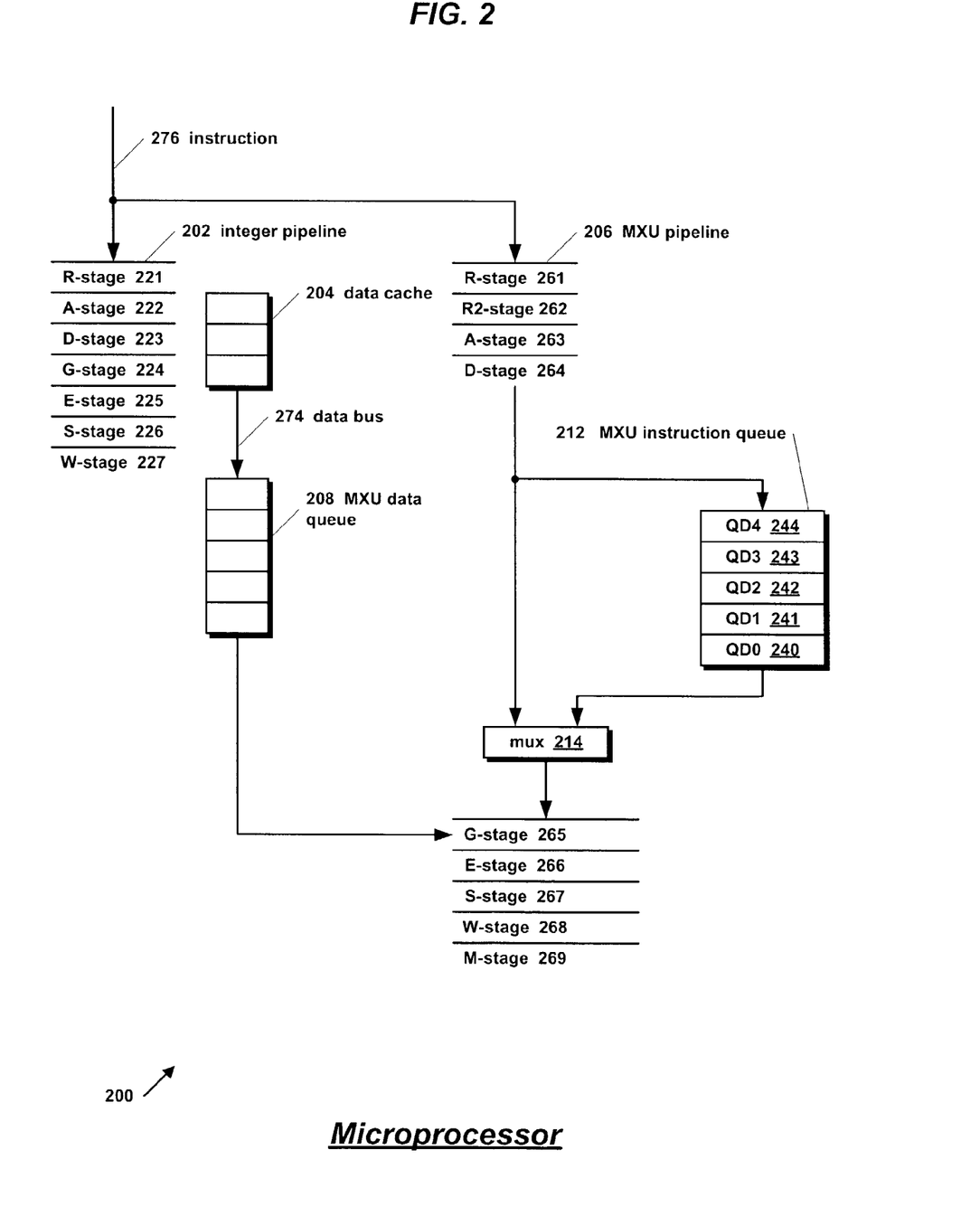
FIG. 2 is a block diagram illustrating a microprocessor according to the present invention.

Referring now to FIG. 2, a block diagram illustrating a microprocessor 200 according to the present invention is shown. Microprocessor 200 includes an integer pipeline 202, a data cache 204, an MXU pipeline 206, an MXU data queue 208, and an MXU instruction queue 212.

The integer pipeline 202 includes a plurality of stages connected together, including an R-stage 221, an A-stage 222, a D-stage 223, a G-stage 224, an E-stage 225, an S-stage 226, and a W-stage 227. The R-stage 221 includes a register file for storing data, such as instruction operands, address generation operands, processor control and status information, flags, stack pointers, segment registers, and an instruction pointer or program counter. The A-stage 222 includes an address generator for generating memory addresses. The D-stage 223 and G-stage 224 are data stages for loading data from memory and data cache 204. Data is provided by data cache 204 to the G-stage 224. The E-stage 225 includes execution units, such as arithmetic logic units for performing integer arithmetic or logical operations. The S-stage 226 includes logic for storing instruction results to memory and data cache 204. The W-stage 227 includes logic for writing back instruction results to the R-stage 221. That is, W-stage 227 is responsible for updating the user-visible state of microprocessor 200. W-stage 227 also retires instructions and is the last stage of integer pipeline 202. Additionally, W-stage 227 provides an operand forwarding function for forwarding results to G-stage 224, E-stage 225, and S-stage 226 of integer pipeline 202.

R-stage 221 receives an instruction 276 from other integer pipeline 202 stages not shown, such as instruction fetch and decode stages. The instruction 276 proceeds down through the various stages of the integer pipeline 202 until it reaches the last stage of the integer pipeline 202, the W-stage 227. As instructions are decoded, they may also be issued to other appropriate functional units based on the type of instruction decoded. In particular, MMX instructions are provided to MXU pipeline 206. In one embodiment, floating-point instructions are issued to a floating-point functional unit.

MXU pipeline 206 includes a plurality of stages connected together, similar to and largely corresponding to the integer pipeline 202. MXU pipeline 206 includes an R-stage 261, an R2-stage 262, an A-stage 263, a D-stage 264, a G-stage 265, an E-stage 266, an S-stage 267, a W-stage 268, and an M-stage 269. In one embodiment, MXU pipeline 206 stages with names corresponding to the integer pipeline 202 stages perform similar functions. In particular, E-stage 266 includes execution units, such as arithmetic logic units, for executing multimedia instructions.

R2-stage 262 is an additional register stage that provides a one clock cycle delay for data cache 204 to provide data to MXU pipeline 206. Due to the presence of R2-stage 262, the MXU pipeline 206 is shifted down one stage with respect to integer pipeline 202. Thus, the MXU pipeline 206 D-stage 264 corresponds to the integer pipeline 202 G-stage 224. M-stage 269 performs a result write-back function for updating the user-visible state of microprocessor 200 similar to W-stage 227 of integer pipeline 202. Additionally, M-stage 269 provides an operand forwarding function for forwarding results to G-stage 265, E-stage 266, or S-stage 267 of MXU pipeline 206. When an instruction reaches M-stage 269, M-stage 269 determines whether or not to update the user-visible state of microprocessor 200 or forward operands based upon whether the instruction is valid and which stage of integer pipeline 202 the instruction has reached, or if it has been retired form integer pipeline 202. The validity and stage are maintained by MXU instruction queue 212 as described in detail below with respect to the remaining Figures.

The same stall conditions of integer pipeline 202 stages R-stage 221 to D-stage 223 also apply to MXU pipeline 206 stages R-stage 261 to A-stage 263. Hence, an instruction that has reached the MXU pipeline 206 D-stage 264 has also reached the integer pipeline 202 G-stage 224. However, a different set of conditions control the stalling or moving of instructions through MXU instruction queue 212 and MXU pipeline 206 stages D-stage 264 to M-stage 269 than integer pipeline 202 stages G-stage 224 to W-stage 227. That is, MXU instruction queue 212 and MXU pipeline 206 stages D-stage 264 to M-stage 269 operate asynchronously to integer pipeline 202 stages G-stage 224 to W-stage 227.

The MXU pipeline 206 R-stage 261 also selectively receives instruction 276 from the integer pipeline 202 instruction fetch and decode stages. Thus, as an instruction 276 is fetched and decoded, if it is an MMX instruction, it proceeds through both the integer pipeline 202 and down through the various stages of the MXU pipeline 206 until it reaches the last stage of the MXU pipeline 206, the M-stage 269, and the last stage of the integer pipeline 202. Depending upon whether certain conditions exist, as described with respect to FIG. 3, instruction 276 may also pass through MXU instruction queue 212 on its way to the end of the MXU pipeline 206.

MXU data queue 208 is coupled to data cache 204 by a data bus 274. MXU data queue 208 comprises a plurality of storage elements, referred to as queue entries, for storing data received from data cache 204 on data bus 274. In the embodiment of FIG. 2, MXU data queue 208 comprises five queue entries. MXU data queue 208 provides data from its bottom entry to G-stage 265 of MXU pipeline 206.

MXU instruction queue 212 resides architecturally in the D-stage 264 of MXU pipeline 206. MXU instruction queue 212 comprises a plurality of storage elements, referred to as queue entries, for storing instructions received from D-stage 264. In the embodiment of FIG. 2, MXU instruction queue 212 comprises five queue entries, denoted QD0 240, QD1 241, QD2 242, QD3 243, and QD4 244. QD0 240 is the bottom entry in MXU instruction queue 212 and QD4 244 is the top entry in MXU instruction queue 212. That is, QD0 240 is at the head of MXU instruction queue 212 and holds the oldest instruction, and QD4 244 is at the tail of MXU instruction queue 212 and holds the newest instruction when MXU instruction queue 212 is full. As an instruction enters MXU instruction queue 212, it enters into the first empty entry nearest the bottom or head of MXU instruction queue 212. For example, if an instruction is occupying QD0 240 and QD1 241, and QD2 242 is the next empty entry, then an incoming instruction will be stored in QD2 242. If MXU instruction queue 212 is completely empty, then the instruction will be stored into QD0 240.

D-stage 264 of MXU pipeline 206 also includes a two-input mux 214. Mux 214 receives an instruction directly from D-stage 264 into the first input. Mux 214 receives an instruction from QD0 240, i.e., from the bottom entry of MXU instruction queue 212, into the second input. Mux 214 provides the instruction selected from the two inputs on its output to G-stage 265 of MXU pipeline 206. When an instruction reaches D-stage 264, if the instruction is valid and MXU instruction queue 212 is empty, and MXU pipeline 206 is moving, i.e., not stalled, then mux 214 selects the first input in order to provide the instruction directly to G-stage 265, thereby bypassing MXU instruction queue 212. However, if MXU instruction queue 212 is not empty or MXU pipeline 206 is stalled, the instruction will enter MXU instruction queue 214, and mux 214 selects the second input in order to provide an instruction in QD0 240 to G-stage 265, until such time as MXU instruction queue 214 becomes empty of instructions.

Figure 3:
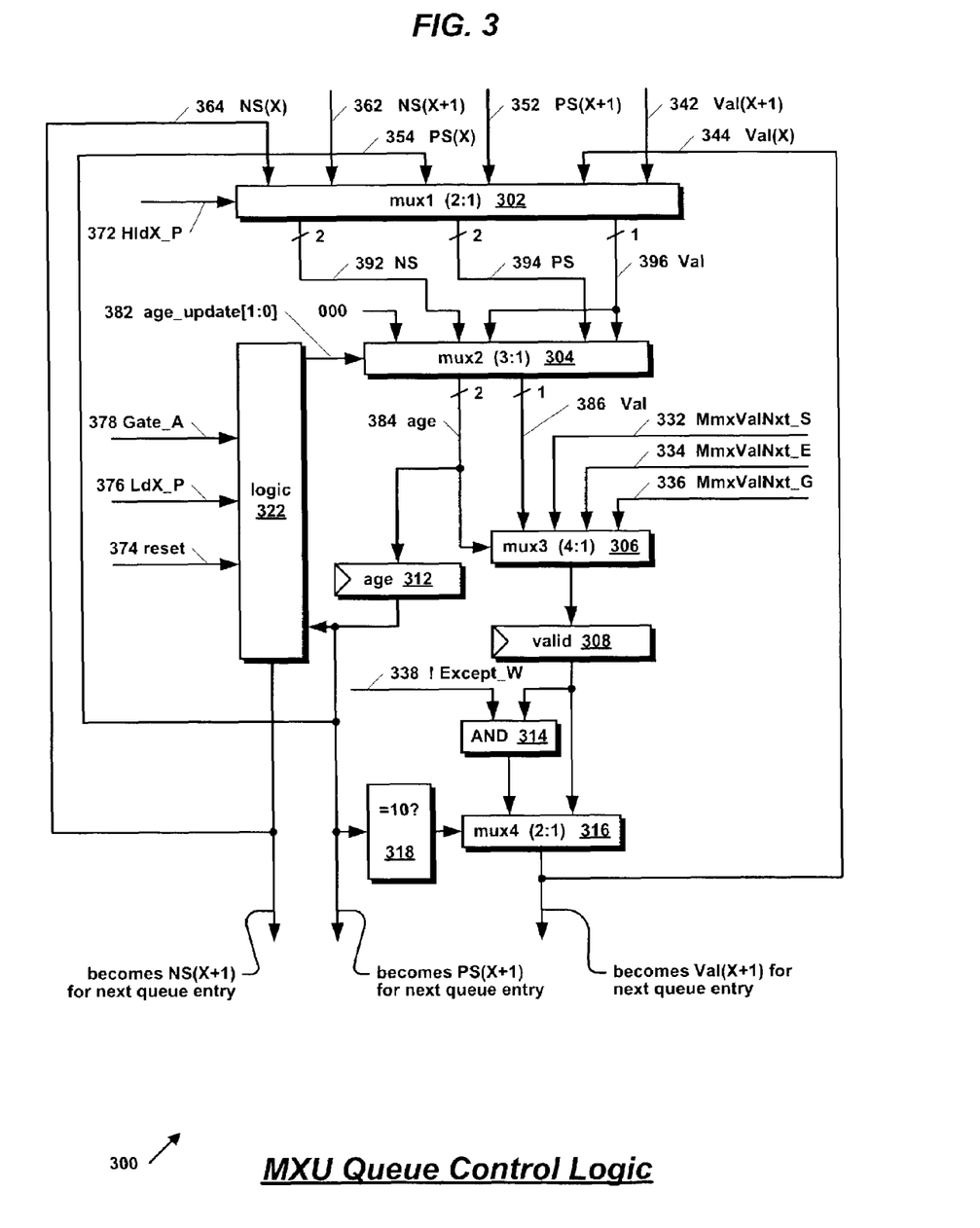
FIG. 3 is a block diagram showing logic for controlling the MXU instruction queue of FIG. 2 according to the present invention.

Referring now to FIG. 3, a block diagram showing logic 300 for controlling MXU instruction queue 212 of FIG. 2 according to the present invention is shown. Control logic 300 includes four multiplexers, denoted mux1 302, mux2 304, mux3 306, and mux4 316, an age register 312, a valid register 308, and assorted logic. Control logic 300 maintains an age and valid status bit for each instruction stored in an entry of MXU instruction queue 212. The age and valid bit are stored in age register 312 and valid register 308, respectively. In the embodiment of FIG. 3, age register 312 comprises two bits, and valid register 308 comprises one bit.

The age of an instruction is denoted "PS", or present state, in FIG. 3. An instruction's age specifies the stage of integer pipeline 202 in which the instruction currently resides. That is, the age values correspond to integer pipeline 202 stage locations of the instruction as 00=E-stage 225 of integer pipeline 202
01=S-stage 226 of integer pipeline 202
10=W-stage 227 of integer pipeline 202
11=beyond W-stage 227 of integer pipeline 202

Thus, once an instruction's age has reached an age of 11, if its valid bit is still set, then the MXU knows that the instruction will complete and that the MXU may update the user-visible processor state. In FIG. 3, "NS" denotes the next stage of integer pipeline 202.

The control logic 300 of FIG. 3 exists for each entry in MXU instruction queue 212. That is, for the 5-entry queue of FIG. 3, five sets of the control logic 300 of FIG. 3 exist. The five sets of control logic 300 are coupled together in a queue arrangement such that the outputs of one set of control logic 300 associated with an entry become the inputs to the set of control logic 300 below it in MXU instruction queue 212. In FIG. 3, "X" denotes a given entry in MXU instruction queue 212, "X+1" denotes the next highest, or next newest, entry in MXU instruction queue 212 after entry X. Thus, PS(0) is the age of the oldest or lowest entry in the queue, i.e., QD0 240 of FIG. 2.

Control logic 300 includes a 2:1 mux 302, denoted mux1 302. Mux1 302 includes three pairs of inputs. The first pair of inputs is Val(X) 344 and Val(X+1) 342. The second pair of inputs is PS(X) 354 and PS(X+1) 352. The third pair of inputs is NS(X) 364 and NS(X+1) 362.

Signal Val(X) 344 is the output of mux4 316 and indicates whether the instruction stored in entry X of MXU instruction queue 212 is currently a valid instruction. Signal Val(X+1) 342 is the output of mux4 316 of entry X+1 of MXU instruction queue 212 and indicates whether the instruction stored in entry X+1 is currently a valid instruction.

Signal PS(X) 354 indicates the current age stored in age register 312 of the instruction stored in entry X of MXU instruction queue 212. That is, PS(X) 354 indicates which of the integer pipeline 202 stages holds the instruction also stored in entry X of MXU instruction queue 212. Signal PS(X+1) 352 indicates the current age stored in age register 312 of the instruction stored in entry X+1 of MXU instruction queue 212.

Figure 4:
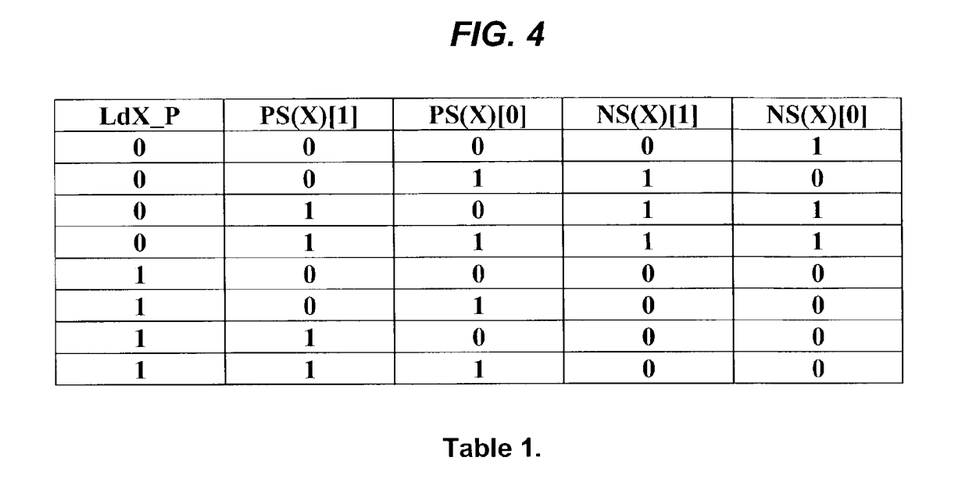
FIG. 4 is a truth table illustrating generation of next state values by the logic of FIG. 3 according to the present invention.

Control logic 300 also includes logic 322 that generates signal NS(X) 364 based on PS(X) 354 and based on signal LdX_P 376, as shown in truth Table 1 of FIG. 4. LdX_P is true, or active, if the instruction is being initially loaded into entry X of MXU instruction queue 212. Signal NS(X) 364 specifies the next integer pipeline 202 stage after the integer pipeline 202 stage holding the instruction stored in entry X of MXU instruction queue 212. Signal NS(X+1) 362 indicates the next integer pipeline 202 stage after the integer pipeline 202 stage holding the instruction stored in entry X+1 of MXU instruction queue 212. As shown in Table 1 of FIG. 4, NS(X) 364 is 00, corresponding to E-stage 225 of integer pipeline 202, if the instruction is being initially loaded into MXU instruction queue 212. Otherwise, NS(X) 364 is determined from PS(X) 354 and HldX_P 372 as shown in Table 1 of FIG. 4.

Referring again to FIG. 3, mux1 302 selects one of the two inputs from each of the three input pairs based upon a selection input HldX_P 372. HldX_P 372 indicates whether or not the entries in MXU instruction queue 212 are to be shifted down. When an instruction is to be shifted down in MXU instruction queue 212, for example due to an instruction being removed from MXU instruction queue 212, HldX_P 372 goes inactive. HldX_P 372 being inactive causes mux1 302 to select the Val(X+1) 342, PS(X+1) 352, and NS(X+1) 362 values from the next higher entry in MXU instruction queue 212. HldX_P 372 being active causes mux1 302 to retain the Val(X) 344, PS(X) 354, and NS(X) 364 values from the current entry in MXU instruction queue 212. Mux1 302 provides the selected next stage value on output signal NS 392, the selected present state value on output signal PS 394, and the selected valid bit value on output signal Val 396.

Control logic 300 also includes a 3:1 mux, denoted mux2 304, coupled to mux1 302. Mux2 304 functions to update the age of the instruction in entry X to its proper value. Mux2 304 receives three instruction status values, i.e., three sets of a valid bit and two age bits, and selects one of the three status values for outputting. The first instruction status value comprises the PS output 394 and Val output 396 of mux1 302. That is, the first instruction status comprises the age selected from among PS(X) 354 and PS(X+1) 352 by mux1 302 and the valid bit selected from among Val(X) 344 and Val(X+1) 342 by mux1 302. The second instruction status value comprises the NS output 392 and Val output 396 of mux1 302. That is, the second instruction status comprises the age selected from among NS(X) 364 and NS(X+1) 362 by mux1 302 and the valid bit selected from among Val(X) 344 and Val(X+1) 342 by mux1 302. The third instruction status value comprises a value of 000, i.e., a valid bit of 0 and an age of 00, which specifies E-stage 225 of integer pipeline 202.

Mux2 304 selects one of the three instruction status values based upon a two-bit selection input age_update 382. Logic 322 generates signal age_update 382 based on signal PS 394, a reset signal 374, signal LdX_P 376, and a Gate_A signal 378, according to the following equations shown in Table 2. In Table 2, the PS[0] and PS[1] bits are the two bits of mux1 302 output signal PS 394.

TABLE 2 age_update[1] = LdX_P | reset;
age_update[0] = Gate_A | PS[0] | PS[1];

A true value on LdX_P 376 indicates that entry X of MXU instruction queue 212 is being loaded with an instruction from D-stage 264, rather than the instruction already being in MXU instruction queue 212. A true value on reset signal 374 indicates MXU instruction queue 212 is being reset. A true value on Gate__A 378 indicates that integer pipeline 202 is not stalled. In the embodiment of FIG. 3, Gate__A 378 indicates only that the stages above S-stage 226 of integer pipeline 202 are not stalled. That is, in the embodiment of FIG. 3, S-stage 226 and W-stage 227 are incapable of stalling, such that once an instruction reaches S-stage 226, it is guaranteed that the instruction will age, i.e., that the instruction will proceed to W-stage 227 of the integer pipeline 202, on the next clock cycle. Similarly, once an instruction reaches W-stage 227, it is guaranteed to retire. The stalling or moving of MXU pipeline 206 is controlled by its own control signals other than Gate__A 378, although the control signals may be derived from Gate A 378.

The equations in Table 2 above specify that mux2 304 will select the third instruction status input with a value of 000 if a reset occurs or if the instruction is being loaded into entry X of MXU instruction queue 212 from D-stage 264 of MXU pipeline 206. Mux2 304 will select the second instruction status input (comprising NS 392 and Val 396) if the instruction is moving to the next integer pipeline 202 stage (i.e., if the integer pipeline 202 is not stalled, as indicated by a true value on Gate__A 378, or if the instruction has already reached at least S-stage 226 of integer pipeline 202, as indicated by a 01, 10, or 11 value on PS 394). Otherwise, the instruction is stalled in the integer pipeline 202, i.e., will not be proceeding down the integer pipeline 202; hence, mux2 304 will select the first instruction status (comprising PS 394 and Val 396).

The age portion 384 of the output of mux2 304 is provided as the input to age register 312. The output of age register 312, which is signal PS(X) 354, is provided as an input to logic 322. Signal PS(X) 354 is also provided to the next lower entry of MXU instruction queue 212 to become PS(X+1) 352 of entry X-1. Similarly, signal NS(X) 364 is provided to the next lower entry of MXU instruction queue 212 to become NS(X+1) 362 of entry X-1. Similarly, signal Val(X) 344 is provided to the next lower entry of MXU instruction queue 212 to become Val(X+1) 342 of entry X-1. Additionally, signal Val(0) 344 and PS(0) 354 of the lowest MXU instruction queue 212 entry, i.e., entry QD0 240, are provided to G-stage 265 of FIG. 2 and piped down through the remaining stages of the MXU pipeline 206. When the instruction reaches M-stage 269 of MXU pipeline 206, M-stage 269 examines the values to determine whether the instruction is valid and which stage of integer pipeline 202 the instruction resides in to determine whether to update the user-visible state of microprocessor 200.

Control logic 300 also includes a 4:1 mux, denoted mux3 306, coupled to mux2 304. Mux3 306 functions to update the valid bit of the instruction in entry X to its proper value. Mux3 306 receives four valid bit inputs. The first valid bit input is Val output 386, which is the valid bit portion of the output of mux2 304. The other three valid bit inputs are the valid bits from the G-stage 224, E-stage 225, and S-stage 226 of integer pipeline 202, denoted MmxValNxt__G 336, MmxValNxt__E 334, and MmxValNxt__S 332, respectively. The output of mux3 306 is provided as the input to valid bit register 308.

Mux3 306 selects one of the four valid bit inputs based upon a selection input, which is the age portion 384 of the output of mux2 304. Hence, if the age 384 of the instruction is 00, then mux3 306 selects the valid bit 336 from the integer pipeline 202 G-stage 224. This is because the instruction is being loaded into MXU instruction queue 212 from the MXU pipeline 206 D-stage 264, which is equivalent to the instruction being loaded from the integer pipeline 202 G-stage 224, i.e., the MXU pipeline 206 D-stage 264 is adjacent to the integer pipeline 202 G-stage 224, since the MXU pipeline 206 is shifted down one stage relative to the integer pipeline 202 because of the presence of the R2-stage 262; hence, the valid bit of the instruction in the integer pipeline 202 G-stage 224 is the correct valid bit to load into valid bit register 308.

If the age 384 of the instruction is 01, then mux3 306 selects the valid bit 334 from the integer pipeline 202 E-stage 225. If the age 384 of the instruction is 10, then mux3 306 selects the valid bit 332 from the integer pipeline 202 S-stage 226. Finally, if the age 384 of the instruction is 11, then mux3 306 selects the valid bit Val 386 from the output of mux2 304. That is, the current valid bit value is retained. Hence, the valid bit value is retained once the instruction passes the integer pipeline 202 W-stage 227, i.e., is retired by W-stage 227, since no condition or event may occur after that point to invalidate the instruction.

Control logic 300 also includes a 2:1 mux, denoted mux4 316, coupled to mux3 306. Mux4 316 functions to update the valid bit if an invalidating condition or event occurs while the instruction is in the integer pipeline 202 W-stage 227. Mux4 316 receives two valid bit inputs. The first input is from the output of valid bit register 308. The second input is the output of an AND gate 314. AND gate 314 is a two-input AND gate. The first input to AND gate 314 is the output of valid bit register 308. The second input to AND gate 314 is the inverse of an Except__W signal 338, denoted "! Except__W 338" in FIG. 3. A true value on Except__W signal 338 indicates that an exception occurred to invalidate the instruction while it was in the integer pipeline 202 W-stage 227. Hence, AND gate 314 generates a false value on its output if the instruction was previously invalid or if an invalidating exception occurred while the instruction was in the integer pipeline 202 W-stage 227.

Mux4 316 selects one of the valid bit inputs based on a selection input, which is the output of a comparator 318. Comparator 318 receives the age of the instruction from the output of age register 312 and compares the age to the binary value 10, which specifies the integer pipeline 202 W-stage 227, as stated above. If the age is 10, then comparator 318 outputs a true value, causing mux4 316 to select the output of AND gate 314. Otherwise, comparator 318 outputs a false value, causing mux4 316 to select the output of valid bit register 308. The output of mux4 316 is Val(X) signal 344, which indicates the current valid bit value of the instruction in entry X of MXU instruction queue 212.

In the manner just described, mux3 306 and mux4 insure that the most current value of the valid bit for the instruction is maintained. This is achieved by obtaining the valid bits 332, 334, and 336 from integer pipeline 202, since if any invalidating condition or event occurs as the instruction proceeds down integer pipeline 202, the microprocessor 200 updates the valid bit for the instruction in the integer pipeline 202; or by invalidating the instruction if an exception occurred while the instruction was in the integer pipeline 202 W-stage 227; or by retaining the valid bit value once the instruction has passed the integer pipeline 202 W-stage 227.

Figure 5:
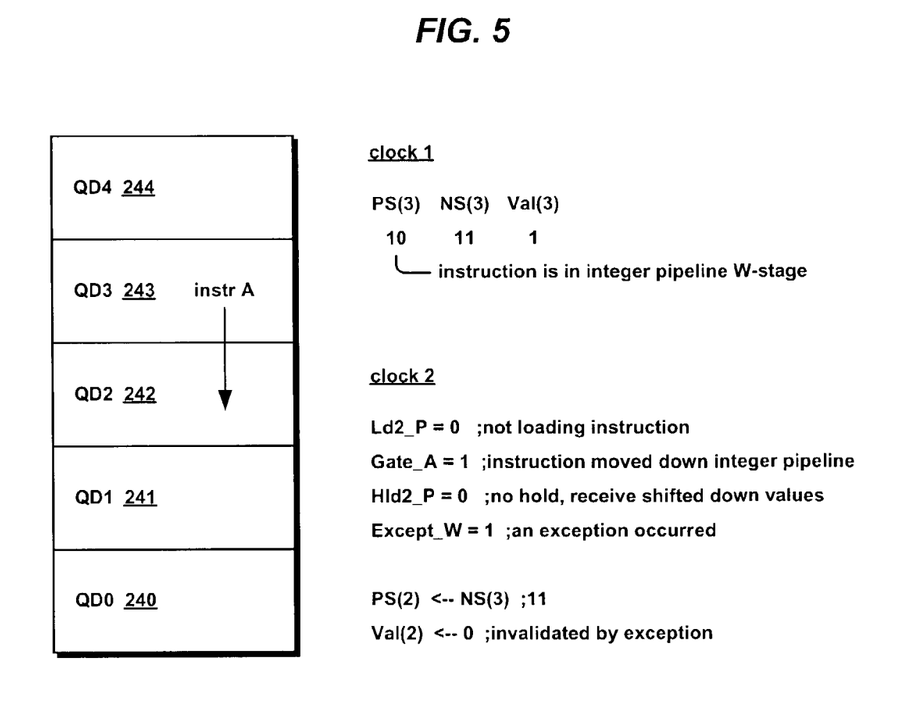
FIG. 5 is an illustration of operation of the microprocessor of FIG. 2 according to the present invention.

Referring now to FIG. 5, an illustration of operation of microprocessor 200 of FIG. 2 according to the present invention is shown. FIG. 5 shows the initial conditions of MXU instruction queue 212 during a first clock cycle, denoted clock 1. FIG. 5 further shows operation of MXU instruction queue 212 during a next clock cycle, denoted clock 2, as the instruction proceeds down the integer pipeline 202 and down MXU instruction queue 212 of FIG. 2 based on the initial conditions and other events described.

During clock 1, FIG. 5 shows an instruction denoted "instr A" in entry 3 (i.e., QD3 243) of MXU instruction queue 212. During clock 1, instr A is in integer pipeline 202 W-stage 227. Hence, instr A's age stored in age register 312 of FIG. 3 of entry 3 is 10. That is, PS(3) signal 354 of FIG. 3 has a value 10, as shown in FIG. 5. Consequently, logic 322 of FIG. 3 generates an NS(3) value of 11, as shown in FIG. 5. Also during clock 1, instr A is valid. Hence, the value stored in valid register 308 is true and Val(3) signal 344 is true, as shown in FIG. 5.

During clock 2, the value of Ld2_P signal 376 is false, as shown, because instr A is not being loaded into MXU instruction queue 212, i.e., instr A was already present in MXU instruction queue 212. Also during clock 2, the value of Gate_A signal 378 is true, as shown, because instr A is proceeding down integer pipeline 202, i.e., integer pipeline 202 is not stalled. Also during clock 2, the value of Hld2_P signal 372 is false, as shown, indicating that the instruction stored in entry 3 of MXU instruction queue 212 will be shifted down to entry 2 because the bottom entry of MXU instruction queue 212 is being shifted out. Also during clock 2, the value of Except_W signal 338 is true, as shown, indicating that an event occurred causing instr A to be invalid.

Given these initial conditions and events, control logic 300 of FIG. 3 for MXU instruction queue 212 entries 2 and 3 will operate during clock 2 as follows. Because PS(3) 354 has a value of 10, comparator 318 will generate a true value on its output causing mux4 316 of entry 3 to select the output of AND gate 314, which will be 0, since an invalidating exception occurred while instr A was in W-stage 227. Thus, a false value indicating instr A is invalid will be generated on Val(3) signal 344 during clock 2.

Mux1 302 of entry 2 of MXU instruction queue 212 will select the "X+1" values, i.e., will select the PS(3) 354, NS(3) 364, and Val(3) 344 values, which are 10, 11 and 0, respectively, because Hld2_P 372 is false, indicating MXU instruction queue 212 is shifting down. Mux2 304 of entry 2 will select the NS output 392 from mux1 302 because instr A proceeded down the integer pipeline 202, indicated by a true value on Gate_A 378. Therefore, the new age of instr A stored in age register 312 of entry 2 at the end of clock 2 will be 11, indicating that instr A has passed integer pipeline 202 W-stage 227. Mux3 306 of entry 2 will select the Val output 386 from mux2 304 because the age output portion 384 of mux2 304 of entry 2 is 11, as just described. The value of the Val 386 input to mux3 306 of entry 2 is 0, since Val(3) 342 was 0, as described above, and mux1 302 and mux2 304 of entry 2 operate to select Val(3) 342 as the Val 386 input to mux3 306. Therefore, the new valid bit stored in valid register 308 at the end of clock 2 will be 0, indicating that instr A is now invalid, which informs MXU pipeline 206 that it may not update the user-visible program state of microprocessor 200 with respect to instr A.

Although the present invention and its objects, features, and advantages have been described in detail, other embodiments are encompassed by the invention. For example, although the invention has been described with respect to an instruction and data queue as part of an MXU, the invention is adaptable for operation with various other types of functional units, such as an Streaming SIMD Extension (SSE) unit, for example. Furthermore, although the present invention has been described with reference to user-visible state of x86 processors, the present invention is adaptable to various processors. Additionally, although the invention has been described in a processor in which the integer pipeline is the functional unit that generally performs the instruction or operation validation function, the invention is adaptable to processors in which the validation function is performed in other and/or additional functional units. Finally, although the present invention has been described with respect to maintaining coherency of status between an integer pipeline and an MMX pipeline for the purpose of knowing if and when the MMX pipeline may update the user-visible state of the processor, the invention is generally applicable to any status coherency problem related to queue-separated functional units. That is, the invention can be used to maintain status coherency between any functional units whose status is skewed in time by the presence of an asynchronous queue between them.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

I claim:

1. An instruction queue in a microprocessor, the instruction queue comprising:
   a first plurality of storage elements, each for storing an instruction to be executed by a first functional unit, said instruction also being stored in one of a plurality of pipeline stages of a second functional unit;
   a second plurality of storage elements, coupled to said first plurality of storage elements, each for storing an age of said instruction stored in a corresponding one of said first plurality of storage elements, said age specifying which of said second functional unit plurality of pipeline stages said instruction is stored in; and
   a third plurality of storage elements, coupled to said first plurality of storage elements, each for storing a valid bit of said instruction stored in said corresponding one of said first plurality of storage elements, said valid bit specifying whether said instruction is valid.

2. The instruction queue of claim 1, wherein said first functional unit uses said age and said valid bit to determine whether to update a user-visible state of the microprocessor with results of said instruction.

3. The instruction queue of claim 2, wherein said user-visible state is comprised in a register file of the microprocessor.

4. The instruction queue of claim 1, wherein the instruction queue receives said instruction from a predetermined stage of said plurality of pipeline stages of said second functional unit, wherein a condition invalidating said instruction may occur subsequent to said instruction being stored in said predetermined stage.

5. The instruction queue of claim 4, wherein said invalidating condition comprises an exception in the microprocessor.

6. The instruction queue of claim 4, wherein said invalidating condition comprises a branch instruction outcome misprediction by the microprocessor.

7. The instruction queue of claim 4, wherein said invalidating condition comprises a pipeline stall in one or more of said first and second functional units.

8. The instruction queue of claim 1, wherein the instruction queue receives said instruction from a stage of said plurality of pipeline stages of said second functional unit prior to an instruction-retiring stage of said plurality of pipeline stages of said second functional unit.

9. The instruction queue of claim 1, wherein the microprocessor may invalidate said instruction after said instruction is stored into the instruction queue.

10. The instruction queue of claim 1, wherein said second functional unit comprises an integer unit.

11. The instruction queue of claim 1, wherein said first functional unit comprises a unit for executing multimedia instructions.

12. The instruction queue of claim 1, wherein said first functional unit comprises a unit for executing floating-point instructions.

13. The instruction queue of claim 1, wherein said first functional unit comprises a unit for executing SSE instructions.

14. The instruction queue of claim 1, further comprising:
control logic, coupled to said second and third plurality of storage elements, for updating said age and said valid bits.

15. The instruction queue of claim 14, further comprising:
an input, coupled to said control logic, for receiving a signal from said second functional unit specifying whether said second functional unit is stalled or is moving said instruction down said plurality of pipeline stages, wherein said control logic updates said age and said valid bit in response thereto.

16. The instruction queue of claim 15, wherein said control logic increases said age if said second functional unit is moving said instruction down said plurality of pipeline stages.

17. The instruction queue of claim 14, further comprising:
a plurality of inputs, coupled to said control logic, each for receiving a signal from said second functional unit specifying whether said instruction also being stored in said one of said plurality of pipeline stages of said second functional unit is valid, wherein said control logic updates said valid bit based thereon.

18. The instruction queue of claim 14, wherein said control logic updates said age and said valid bit based on whether the instruction queue is shifting said instruction from one of said first plurality of storage elements to another of said first plurality of storage elements.

19. The instruction queue of claim 14, wherein said control logic updates said age to an initial age value if said instruction is being loaded into the instruction queue.

20. The instruction queue of claim 14, further comprising:
an input, coupled to said control logic, for receiving a signal from said second functional unit specifying whether an invalidating condition has occurred while said instruction was stored in a predetermined one of said plurality of pipeline stages of a second functional unit, wherein said control logic updates said valid bit to an invalid value if said invalidating condition occurred while said instruction was stored in said predetermined pipeline stage.

21. The instruction queue of claim 20, wherein said predetermined one of said plurality of pipeline stages comprises a last stage in said second functional unit in which said invalidating condition may occur.

22. The instruction queue of claim 1, wherein the microprocessor determines whether to update a user-visible state of the microprocessor with results of said instruction based on said age and said valid bit.

23. An apparatus in a microprocessor for maintaining instruction status coherency between two instruction pipelines that operate asynchronously due to an instruction queue separating the two pipelines, the instruction queue having N entries for storing N instructions, the apparatus having N logic elements corresponding to the N instruction queue entries each comprising:
an age register, for storing an age of one of the N instructions received on an age signal, said age specifying a stage in which said instruction is also stored in a first of the two pipelines;
a valid register, for storing a valid bit of one of the N instructions;
a multiplexer, for selecting one of a plurality of valid bit signals for provision to said valid register based on said age signal, said valid bit signals specifying whether instructions stored in a corresponding plurality of stages of said first pipeline are valid.

24. The apparatus of claim 23, wherein the N logic elements are coupled together as a queue corresponding to the N entries of the instruction queue.

25. The apparatus of claim 24, wherein the N logic elements are coupled together as a queue such that an output of said age register in one of the N logic elements is coupled to an input of a succeeding one of the N logic elements.

26. The apparatus of claim 24, wherein the N logic elements are coupled together as a queue such that an output of said valid register in one of the N logic elements is coupled to an input of a succeeding one of the N logic elements.

27. The apparatus of claim 24, wherein a bottom one of the N logic elements is coupled to a predetermined stage of a second of the two pipelines for providing said age and said valid bit thereto.

28. The apparatus of claim 27, wherein said second of the two pipelines selectively updates a register file of the microprocessor with results of said instruction based on said age and said valid bit.

29. The apparatus of claim 27, each of the N logic elements further comprising:
a second multiplexer, coupled to an output of a preceding one of the N logic elements, for selectively retaining said age and valid bit or receiving said age and valid bit from said preceding one of the N logic elements, based on whether the instruction queue is shifting.

30. The apparatus of claim 23, each of the N logic elements further comprising:
update logic, coupled to said age register, for updating said age based on whether said first of the two pipelines is stalled.

31. The apparatus of claim 30, wherein said update logic updates said age also based on said age signal.

32. The apparatus of claim 23, wherein said multiplexer also receives a valid input selectively coupled from an output of said valid register.

33. The apparatus of claim 23, each of the N logic elements further comprising:
invalidation logic, coupled to said valid register, for invalidating said instruction in response to an exception signal, said exception signal indicating an exception occurred to invalidate said instruction while said instruction was stored in a predetermined stage of said first pipeline.

34. A microprocessor, comprising:
a first instruction pipeline, comprising a plurality of stages for storing instructions;
a second instruction pipeline, coupled to said first instruction pipeline, for receiving from said first instruction pipeline a first portion of said instructions to execute;

an instruction queue, coupled to store a second portion of said first portion of instructions until said second instruction pipeline is ready to execute said second portion; and control logic, coupled to said instruction queue, for storing a present state and a valid bit for each instruction of said second portion, said present state specifying one of said plurality of first instruction pipeline stages in which said instruction of said second portion is stored.

35. The microprocessor of claim 34, wherein said instruction queue and said second instruction pipeline operate asynchronously from said first instruction pipeline.

36. The microprocessor of claim 34, further comprising:
a multiplexer, coupled to said instruction queue and said second instruction pipeline, for selectively bypassing said instruction queue in said second instruction pipeline.

37. The microprocessor of claim 36, wherein said multiplexer bypasses said instruction queue if said instruction queue is empty.

38. The microprocessor of claim 37, wherein said multiplexer does not bypass said instruction queue if said second instruction pipeline is stalled.

39. The microprocessor of claim 34, further comprising:
a data cache, coupled to said first instruction pipeline, for providing data specified by said instructions; and
a data queue, coupled to said data cache, for storing data specified by said second portion of instructions.

40. The microprocessor of claim 34, wherein said also specifies whether said instruction has been retired from said plurality of first instruction pipeline stages.

41. A method for maintaining instruction status coherency between functional units in a microprocessor whose stages are unaligned due to the presence of a queue, the method comprising:
storing an instruction in a pipeline stage of a first functional unit;
storing in said pipeline stage a first valid bit for said instruction;
storing said instruction in a queue of a second functional unit until said second functional unit is ready to execute said instruction;
storing in said queue a second valid bit for said instruction;
storing in said queue an age of said instruction, wherein said age specifies which pipeline stage of said first functional unit said instruction is stored in;

receiving a signal indicating whether said first functional unit pipeline is stalled; and
updating said age and said second valid bit based on said first valid bit and said receiving said signal.

42. The method of claim 41, wherein said updating comprises increasing said age if said signal indicates said first functional unit pipeline is not stalled.

43. The method of claim 41, wherein said updating comprises retaining said age if said signal indicates said first functional unit pipeline is stalled.

44. The method of claim 41, wherein said updating comprises updating said second valid bit with said first valid bit.

45. The method of claim 41, further comprising:
receiving a signal indicating whether a condition occurred causing said instruction to be invalid; and
storing a value in said second valid bit indicating said instruction is invalid if said signal indicates said condition occurred causing said instruction to be invalid.

46. The method of claim 41, wherein said pipeline stage of said first functional unit is a stage prior to a stage of said first functional unit pipeline that retires instructions.

47. The method of claim 41, further comprising:
determining whether to update a user-visible state of the microprocessor based on said second valid bit and said age.

48. The method of claim 41, wherein said age also specifies whether said instruction has been retired from said first functional unit.

49. An instruction queue in a microprocessor, the instruction queue comprising:
a first plurality of storage elements, each for storing an instruction to be executed by a first functional unit, said instruction also being stored in one of a plurality of pipeline stages of a second functional unit; and
a second plurality of storage elements, coupled to said first plurality of storage elements, each for storing an age of said instruction stored in a corresponding one of said first plurality of storage elements, said age specifying one of said second functional unit plurality of pipeline stages, wherein said specified one of said second functional unit plurality of pipeline stages stores a present status of said instruction.

50. The instruction queue of claim 49, wherein said present status specifies whether said instruction is valid.

* * * * *